United States Patent [19]

Hatamura

[11] Patent Number: 4,586,577
[45] Date of Patent: May 6, 1986

[54] LOAD CONVERTER

[76] Inventor: Yotaro Hatamura, 2-12-11 Kohinata, Bunkyo-ku, Tokyo, Japan

[21] Appl. No.: 586,759

[22] Filed: Mar. 6, 1984

[30] Foreign Application Priority Data

May 31, 1983 [JP] Japan ................................. 58-96415

[51] Int. Cl.⁴ ........................ G01G 3/14; G01L 1/22
[52] U.S. Cl. ................................. 177/211; 73/862.65
[58] Field of Search ..................... 177/211; 73/862.65

[56] References Cited

U.S. PATENT DOCUMENTS 3,433,063  3/1969  Cate ................................. 73/862.65
3,439,761  4/1969  Laimins ............................ 177/211
3,706,349  12/1972  Paelian et al. ..................... 177/211

Primary Examiner—George H. Miller, Jr.
Attorney, Agent, or Firm—Wenderoth, Lind, Ponack

[57] ABSTRACT

A load converter having a force-sensitive and deformable section which has fixed portions, movable portions and a pair of thin, annular parallel, spaced, flexible portions extending so as to connect the fixed and movable portions together. Joint regions, which are connected to the fixed and movable portions, of each of the above-described flexible portions are made divergent toward the fixed and movable portions so as to have a radius of curvature of substantially not less than 2T, wherein T is a minimum thickness of each of the flexible portions.

9 Claims, 6 Drawing Figures

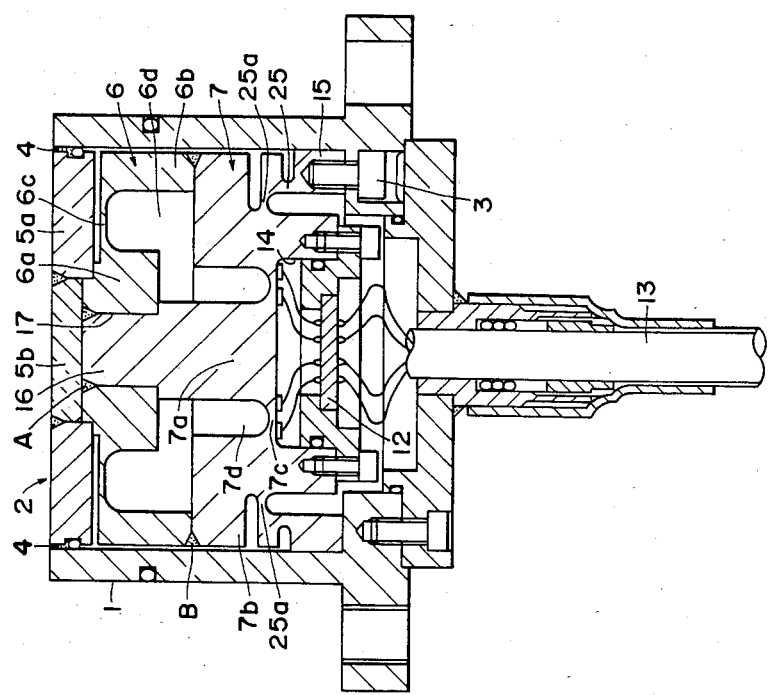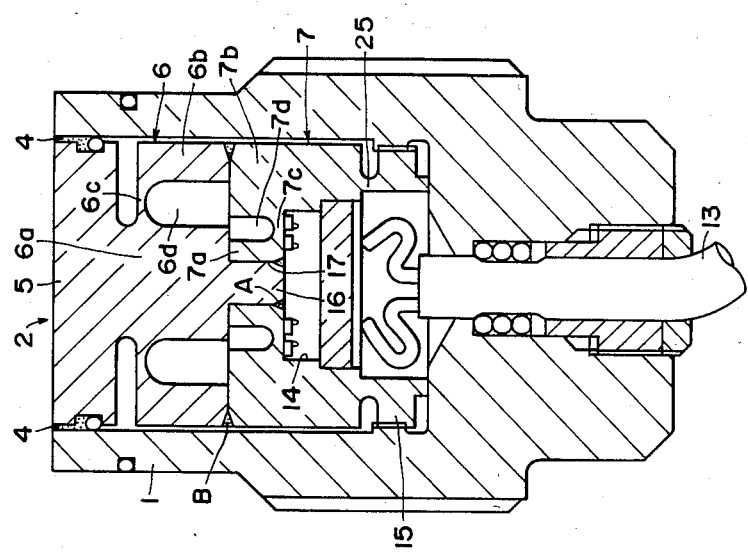

LOAD CONVERTER

BACKGROUND OF THE INVENTION

The present invention relates in general to a load converter, and more particularly to a load converter, wherein a force-sensitive and deformable section thereof consists of structure composed of fixed portions, movable portions and a pair of thin, annular parallel-spaced, flexible portions extending so as to connect the fixed and movable portions together.

A load converter of the type described has been used to determine, for example, the level of force applied from a pulverulent body in a silo to an inner surface thereof, and the level of force applied to an outer surface of a shield excavator while it is in operation. Machines utilizing such a load converter in combination with an automatic controller have been manufactured increasingly. The load converter used for such purposes is required to have, in addition to the liner characteristics and non-hysteresis characteristics which are essential to a regular load converter, the rigidity of a detector portion thereof, less sensitivity to torque and to the other forces, such as a frictional force, than the force in the direction of the pressure to the detector section, and substantially the same level of outputs irrespective of the positions of the application points on the detector section.

A load converter which meets these requirements is disclosed in Japanese Patent Publication No. 57-7657, published Feb. 12, 1982. The construction and technical problems of this known load converter will be described first with reference to FIG. 5 prepared on the basis of the disclosures in the above patent publication.

In FIG. 5 which shows the conventional load converter, a detector section has a pressure receiving member 5, a pair of disc type members 6, 7 and a seat 10, and is mounted on the inner side of a case 1. The two disc type members 6, 7 are hollowed out from one surface of each thereof to form recesses 6d, 7d, which define thin, annular, flexible portions 6c, 7c supported at their respective both ends on rigid parts 6a, 6b, 7a and 7b. These two disc type members 6, 7 are abutted on each other in such a manner that the recesses 6d, 7d communicate with each other, to thereby form structure having flat, parallel plates, which consist of the two thin annular, flexible portions 6c, 7c. The disc type members 6, 7 are joined to the pressure receiving member 5 with bolts 8, and to the seat 10 with bolts 9. The seat 10 is joined to the case 1 with bolts 3. A clearance between the case 1 and pressure receiving member 5 is sealed with an elastic body 4 having a high elasticity.

If the pressure receiving member 5 receives a load on its upper surface, the pressure receiving member 5 and the associated inner rigid parts 6a, 7a joined to the pressure receiving member 5 are pressed downward, and the outer rigid parts 6b, 7b are joined to the seat 10 supported on the case such a manner that the flexible portions 6c, 7c are displaced in the vertical direction alone substantially without inclining the movable portion. If strain gauges 11a–11d are pasted on outer surfaces of inner and outer joint regions of the flexible thin portion 7c, the strain gauges 11b, 11c sense expansion strain, and the strain gauges 11a, 11d contraction strain. Therefore, when a Wheatstone bridge is formed by these four strain gauges 11a–11d, strain ascribed to the deformation of the flexible thin portions 6c, 7c which causes the movable portion to be inclined, is not detected. Accordingly, only such strain that is caused by the deformation of the movable portion due to the vertical movements thereof can be detected irrespective of positions on which a load is applied. Referring to the drawing, reference numeral 12 denotes a terminal board, and reference numeral 13 denotes a lead wire.

However, in the known structure shown in FIG. 5, even a very small error in the positions of the strain gauges has a great influence upon the results of measurement. Therefore, it is very difficult to carry out a strain gauge pasting operation accurately. The use of a load converter is as referred to previously. When a load converter is used in a silo, it often receives external force far greater than that estimated in advance, at such time that a bridge of a pulverulent body therein is destroyed suddenly altogether. When a load converter is used in a shield excavator, it often receives such external force at such time that the excavator encounters a sudden ejection of high-pressure water in the portion of the soil being dug which is in a boundary between two sections of different geological features. When a load converter, which has flat and parallel plates with joint regions at both end portions of the plates are bent at right angles as shown, receives such an external force, stress concentration having a peak stress concentration factor of about 5 occurs at these right-angled joint regions. Such a stress concentration necessarily has a bad effect on the detecting performance of a load converter. In the known load converter, the most important portion thereof does not have the necessary strength to withstand such an overload, whereas the remaining portion thereof has sufficiently high strength with respect thereto. Thus, there is yet room for improvement of the known load converter.

SUMMARY OF THE INVENTION

In order to eliminate the above-mentioned drawbacks encountered in the conventional load converter, the applicant has made experiments repeatedly to clarify the correlation between the dimensions of the radius of corner portions, which are usually provided for avoiding the occurrence of stress concentration, of the structure having flat, parallel plates and the detecting performance of a load converter.

Some of the results of the experiments are shown in FIG. 6. This figure is a graph of strain occurring when a load W is 20 kg, on outer surfaces of materials having a Young's modulus of 21000 kgf/mm$^2$, a depth of 10 mm, a bore (having a width L of 10 mm and radii R of four corner portions of 0.5 mm, 1 mm, 2 mm, 3 mm, 4 mm, and 5 mm), and upper and lower deformation-sensitive members having a thickness T of 1 mm. The length (mm) is taken in the direction of the axis of abscissas, and strain output (ust) in the direction of the axis of ordinates. Corner portions having a radius R of curvature of around 0.5 mm are usually provided for avoiding the occurrence of stress concentration. The length of flat portions, which have a thickness T of 1 mm, of structure having corner portions of this radius of curvature is necessarily 9 mm. However, when a radius R of curvature of the corner portions is 5 mm, flat portions substantially cannot be formed; the portions of the structure which are on the upper and lower sides of the bore are rounded semicircularly as a matter of course. As is clear from FIG. 6, when R=0.5 mm, peaks of extension and contraction curves appear in the portions of the upper and lower plates which are 4.55 mm away in the rightward and leftward directions from the center of the width L of a bore, and the extension and contraction curves stand acutely toward these peaks.

The above are the reasons why even a very small error referred to previously in the strain gauge-pasting positions has a great influence upon the results of measurement. A load converter having a radius R of curvature of 1 mm and acutely standing extension and contraction curves is improved to a certain, not to say, sufficient, extent. However, when R=2 mm, the extension and contraction curves are rounded to such an extent a small error in the stain gauge-pasting positions poses substantially no problems. The peaks of extension and contraction curves for a load converter, in which R=2 mm, appear in the portions of the upper and lower plates which are 3.3 mm away in the rightward and leftward directions from the center of the width L of a bore. The degree of roundness of these curves increases in proportion to a value of R.

OBJECTS AND SUMMARY OF THE INVENTION

An object of the present invention is to provide an improved load converter which can eliminate disadvantages encountered in the known device.

Another object of the present invention is to provide a new load converter which does not require a special regard in positioning strain gauges.

A further object of the present invention is to provide a load converter which has greatly improved strength against an overload.

Another object of the present invention is to provide a load converter which can detect an unexpectedly or excessively large force which prior load converters have been unable to determined.

Another object of the present invention is to provide a new load converter which has a simple construction.

The present invention has been achieved on the basis of the above-described knowledge. In a load converter of the present invention, a force-sensitive and deformable section thereof has the structure composed of fixed portions, movable portions, and a pair of thin, annular parallel-spaced, flexible portions extending so as to connect the fixed and movable portions together. According to the invention, joint regions, which are connected to the fixed and movable portions, of each of the flexible thin portions are made divergent toward the fixed and movable portions so as to have a radius of curvature of substantially "2T" or more, wherein T is a minimum thickness of each of the flexible portions.

The joint regions having a radius of curvature of substantially 2T or more include not only the structure of corner portions having an arcuate cross section, but also such structures as corner portions each consisting of at least two cross-sectionally arcuate bodies, and corner portions each of which consists of a body having a sine curve or a stepped surface. These corner portions are equivalents of the first-mentioned corner portions of arcuate cross section.

In the load converter according to the present invention, the accuracy of the position of the gauges is not so critical as required by the conventional device, so that a troublesome operation of fixing the strain gauges can be avoided. It is also capable of preventing stress concentration from occurring in joint regions of flat, parallel portions of a pressure-sensitive, deformable section thereof. This enables the detector section to have a high strength with respect to an overload to be formed. The invention is very advantageous in these respects.

The novel features of the invention which are considered characteristic of the invention are set forth in particular in the appended claims. The invention, however, both as to its construction and to its method of operation, together with additional objects and features thereof, will be best understood from the following description of specific and preferred embodiments when read in connection with the accompanying drawings.

BRIEF DESCRIPTION OF THE DRAWINGS

FIGS. 2-4 are sectional view of other embodiments of the present invention;

DETAILED DESCRIPTION OF THE INVENTION

Figure 1:
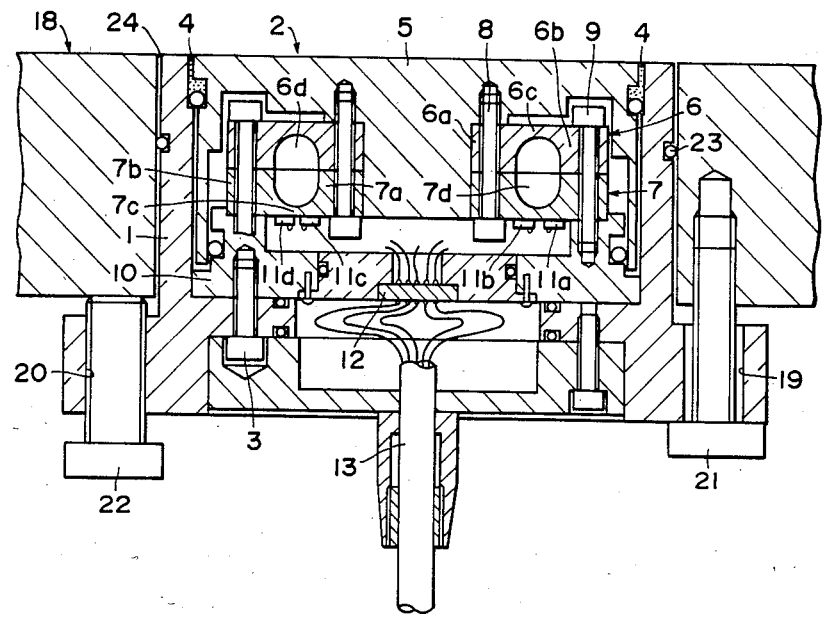
FIG. 1 is a sectional view of a load converter according to the present invention, which is set on a wall of an apparatus.

The present invention will now be described with reference to four embodiments shown in FIGS. 1-4. In order to have the present invention easily understood in comparison with the known load converter shown in FIG. 5, the same reference numerals are used for the equivalent or similar parts.

Figure 5:
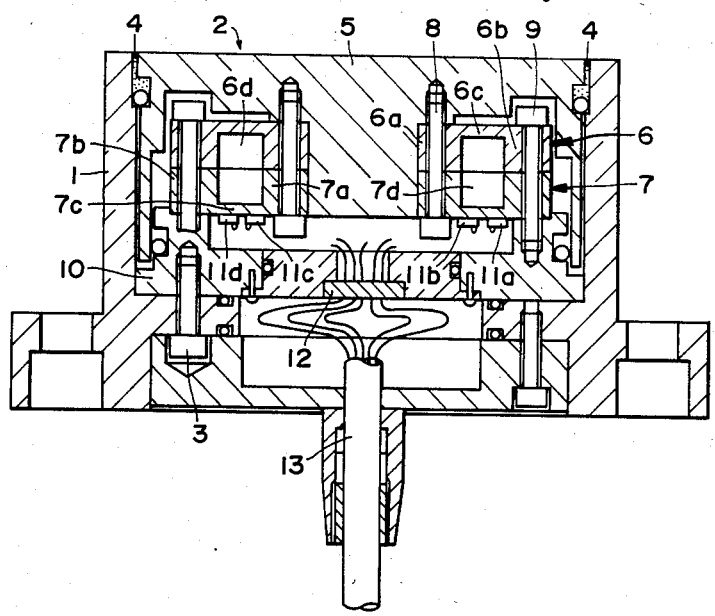
FIG. 5 is a sectional view of a known load converter.
Figure 4:
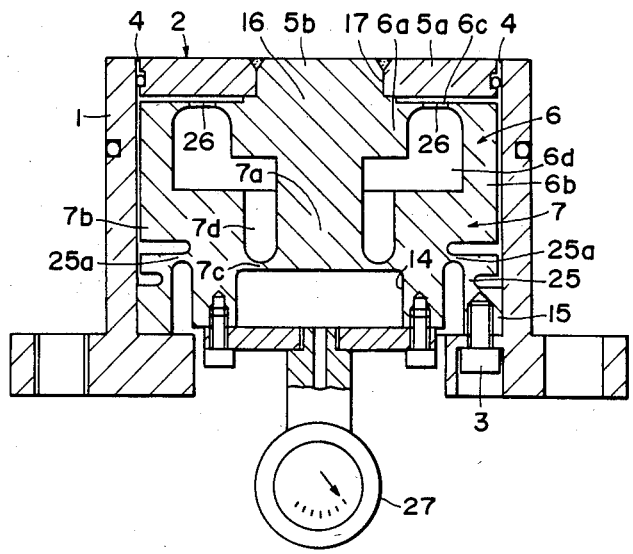
Figure 6:
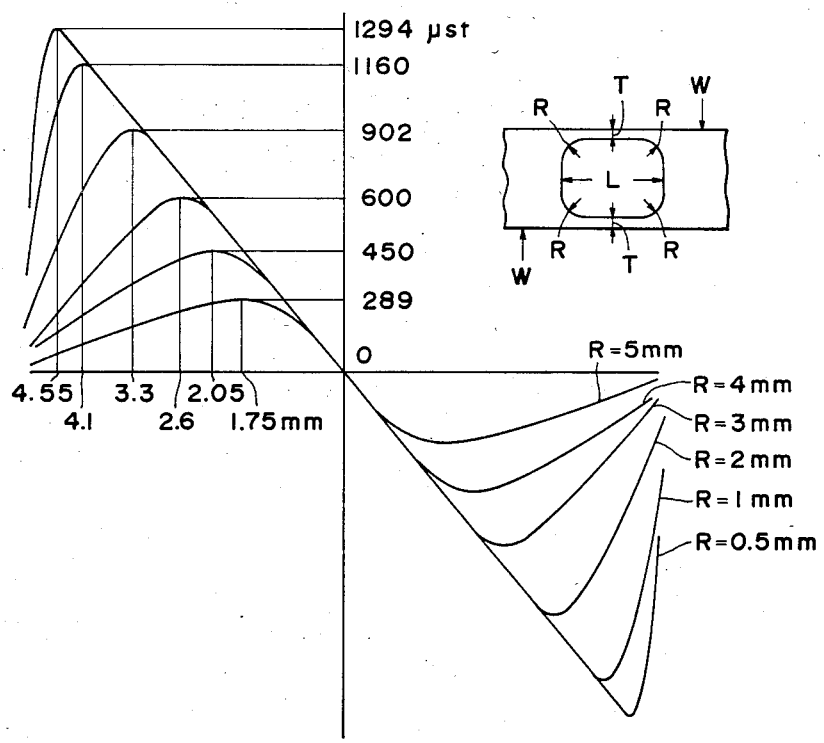
FIG. 6 is a graph showing the correlation between the shape of a joint region of each of two parallel-spaced, thin, annular, flexible portions and the detecting performance of the load detector.

The differences between the load converters shown in FIGS. 1 and 5 are as follows. Each of the thin, annular, flexible portions 6c, 7c in the load converter shown in FIG. 5 consists of a flat plate having a constant thickness. Each of the corresponding portions of a load converter shown in FIG. 1 is not a flat plate; the load converter shown in FIG. 1 has arcuate corner portions (joint portions), a radius of curvature of which is at least 2T, wherein T is a thickness of the central, thinnest part of each. Thus, the strain gauges 11a-11d are attached to flat outer surfaces of joint regions of the flexible portions 6c, 7c which joint regions have increasing thickness in directions from the flexible portions 6c, 7c toward the movable rigid (inner) portions 6a, 7a and the fixed rigid (outer) portions 6b, 7b. These arcuate corner portions may be formed so as to have a squarely stepped surface instead of an arcuate surface, not illustrated. The mere formation of corner portions having the above-mentioned shape enables strain gaugepasting operations to be carried out much more easily, and the strength of a pressure-sensitive section with respect to an overload to be improved to a great extent. No inconveniences occur at all even if the two disc type members 6, 7 have different thicknesses T.

When the load converter is set in a wall 18 of an apparatus with an outer surface of a pressure receiving member 5 projected or otherwise depressed from an inner surface of the wall 18, an actual measurement value becomes extremely larger or smaller than a real value due to the projection or depression. Also, when a load converter is set in the wall 18 with the outer surface of the pressure receiving member 5 inclined downward or upward, an actual measurement value becomes smaller or larger than a real value. Therefore it is necessary that the pressure receiving member 5 be set by regulating the height of the outer surface thereof in such a manner that the same outer surface is flush with the inner surface of the wall 18. Accordingly, it is preferable to employ load converter-mounting structure shown in FIG. 1, in which the height of the outer surface of the pressure receiving member 5 can be regulated by a combination of the drawing force of bolts 21 inserted into a plurality of clearance holes 19 made in a flange portion of a case 1 and the compressive force of bolts 22 inserted into a plurality of threaded holes 20 made in the mentioned flange portion. After such regulating and setting operations have been completed, the case 1 may contact slightly any portion of a surface of a mounting hole 24 in the wall 18. When an O-ring 23 is fitted around an outer circumferential surface of the case 1, a clearance between the same surface and a surface defining the mounting hole 24 can be sealed.

In FIGS. 2 and 3 showing preferred embodiments of the invention, a lower, thin, annular, flexible portion 7c is formed at a position, which is the greatest possible distance away from the surface defining the hole 24. Namely, inner rigid parts 6a, 7a joined to the pressure receiving member 5, i.e. movable portions are formed substantially in the shape of an inverted frustum of a cone unlike the corresponding circular portions of the load converter shown in FIG. 1. When the movable portions are formed in this manner, a recess 14 can be formed under and on the inner side of an outer joint region of the lower, thin, annular, flexible portion 7c. In addition, a seat portion 15 surrounding the recess 14 and joined to a rigid part 7b can be formed. When strain gauges are used as converter means, the recess 14 provides strain gauge fixing positions as illustrated in the drawings. The seat portion 15 makes it unnecessary to form the seat 10 additionally, which is shown in FIG. 1. The recess 14 also provides mounting positions when differential transformers or piezoelectric elements are used as converter means. In addition, as will be referred to in detail in the description of the embodiment shown in FIG. 4, the recess 14 can also be utilized as a container for sealing a pressure-transmitting liquid therein.

Two members 6, 7 are butted on each other so as to communicate two recesses 6d, 7d with each other, and the inner, rigid parts 6a, 7a are connected together and outer, rigid parts 6b, 7b are combined unitarily by a suitable fixing means, to make it unnecessary to provide bolt inserting holes shown in FIG. 1. This enables a diameter of the load converter as a whole to be minimized, and prevents a decrease in the strength or rigidity thereof. In order to align and butt these two members 6, 7 with and on each other correctly with ease, it is preferable that a central shaft 16 is projected from either of the inner, rigid parts 6a, 7a with a bore 17 for inserting the central shaft 16 thereinto formed in the other.

When the members 6, 7 are joined together by a friction-pressing method, the central shaft 16 and bore 17 can constitute the center of a high-speed rotational movement of the pressure-sensitive portion. In order to combine these members 6, 7 with each other by a welding method, an outer circumferential portion A of the central shaft 16 is butted on a surface of the bore 17 to weld outer circumferential portions B of the members 6, 7 to each other. In order to combine these members 6, 7 with each other by diffusion welding or with a bonding, the contact surfaces of the inner rigid parts 6a, 7a are joined together, and similarly the outer rigid parts 6b, 7b are joined together.

Provided that the pressure receiving member 5 is connected to the inner rigid parts 6a, 7a, the pressure receiving member 5 may be formed integrally with the member 6 as shown in FIG. 2. Similarly, the pressure receiving member 5 may be formed of two divided parts 5a, 5b and then welded to each other afterward, as shown in FIG. 3.

When a measuring operation is carried out with a load converter, which is set in an apparatus as mentioned above, unexpectedly great force is applied in some cases to the wall 18 (FIG. 1) thereof under certain conditions to deform the same. When the wall 18 of the apparatus is deformed, the force is transmitted to a detector section reversely via a load converter mounting portion and detected as if the force received were the exact force to be detected. Thus, undesirable measurement results are necessarily obtained showing false variations in the force received on the pressure receiving surface.

In order to prevent an external, lateral or bending force, which is added to the case 1, from being transmitted to the detection section, the present invention provides some measures as illustrated in FIGS. 2 and 3. In the embodiment of FIG. 2, a thin cylindrical part 25 in the seat portion 15 is formed such that it is capable of being bent laterally when the case 1 receives a lateral force. In the other embodiment of FIG. 3, a thin annular part 25a in the seat portion, in addition to the aforesaid thin cylindrical part 25 (FIG. 2), is formed so that it is capable of being curved when the case 1 receives a bending force. When the dimensions of these thin parts 25, 25a are determined in such a manner that an amount of displacement of the load converter as a whole does not exceed a predetermined level, the required detecting performance of the load converter is not spoiled. Accordingly, a measuring operation can be carried out at a sufficiently high reliability under both normal conditions and overload conditions.

In all of the embodiments described above, the members 6, 7 are made by a comparatively simple mechanical process, such as mold forging and a latching process. In such cases, structure having parallel-spaced, thin, annular plates can be formed accurately to a predetermined shape and predetermined dimensions but it requires afterward troublesome operations for joining the members 6, 7 to each other unitarily by welding, friction-pressing, diffusion welding or bonding the same. In the case where the accuracy of manufacturing the mentioned structure will decrease only to a small extent provided that such a trouble operation can be omitted, the membes 6, 7 can be made integrally by the hollow casting techniques. When the hollow casting techniques are used, cavities corresponding to the recesses 6d, 7d shown in FIG. 3 are formed by a core suspended from the outside. Consequently, a cast product thus obtained necessarily has through bores in the portion thereof at which the core is supported in a suspended state. This is why the upper, thin, annular, flexible portion of the load converter shown in FIG. 4, which is obtained by casting and has the same construction as the load converter shown in FIG. 3, has a plurality of through bores 26 in its central region. These through bores 26 are utilized to set the strength of a load converter to a predetermined design level by correcting the diameter thereof. When the through bores 26 are provided in an upper portion of the load converter with no bores 26 provided in a lower portion thereof, the recess 14 can be utilized as a container for sealing a liquid therein. Therefore, when a pressure gauge 27 is connected to the load converter as shown in the drawing, a load can be determined in terms of pressure.

As may be understood clearly from the above description, the present invention has a comparatively simple construction, in which each of a plurality of joint regions of thin, annular, flexible portions is formed so as to have a radius of curvature two times as large as a minimum thickness of each of the flexible portions, or so as to have a shape of an equivalent effect. Accordingly, it is permissible to pay less regard to the accuracy of the strain gauge attaching positions. Since this load converter has greatly improved strength with respect to an overload, excessively large force, which occurs suddenly and has been unable to be determined, can be detected.

Although the present invention has been described with reference to the preferred embodiments thereof, many modifications and alterations can be made within the spirit of the invention.

What is claimed is:

1. A load converter having a force-sensitive and deformable section, said force-sensitive and deformable section comprising fixed portions, movable portions, a pair of annular flexible thin portions having joint regions connecting said flexible thin portions to said fixed portions and said movable portions, said flexible thin portions being annular and parallel to and spaced from each other in directions perpendicular to planes parallel thereto and extending to connect said fixed portions with said movable portions, wherein said joint regions have flat outer surfaces and curved inner surfaces opposite said flat outer surfaces said joint regions connecting said flexible thin portions to said fixed portions have thicknesses which increase in a direction from said flexible thin portions to said fixed portions, said joint regions connecting said flexible thin portions to said movable portions having thicknesses which increase in a direction from said flexible thin portions to said movable portions, said load converter further comprising force-sensitive gauges attached to said flat outer surfaces of said joint regions formed substantially divergent toward said fixed portions and said movable portions such that said curved inner surfaces of joint regions have a radius of curvature of substantially no less than 2T, wherein T is a minimum thickness of said flexible thin portions.

2. A load converter according to claim 1, further comprising a recess under and on the inner side of an outer joint region of said lower flexible portion, and a seat under and on the outside of said outer joint region.

3. A load converter according to claim 2, wherein said recess has strain gauges attached thereto.

4. A load converter according to claim 2, wherein said seat has a thin cylindrical part, thereby preventing an external lateral force from being transmitted to the detection section when the external force is applied to said force-sensitive and deformable section.

5. A load converter according to claim 2, wherein said seat has a thin annular part, thereby preventing a bending force from being transmitted to the detection section when the external force is applied to said force-sensitive and deformable section.

6. A load converter according to claim 1, wherein said force-sensitive and deformable section consists of upper and lower members fixedly abutting on each other.

7. A load converter according to claim 1, wherein said force-sensitive and deformable section is formed integrally.

8. A load converter having a force-sensitive and deformable section, said force-sensitive and deformable section comprising fixed portions, movable portions, a pair of flexible thin portions and joined regions connected to said fixed portions and said movable portions, said flexible thin portions being annular and parallel-spaced to each other and extending to connect said fixed portions with said movable portions, wherein said joint regions are formed substantially divergent toward said fixed portions and said movable portions such that said joint regions have a radius of curvature of substantially not less than 2T, wherein T is a minimum thickness of said flexible thin portions, each of said movable portions having substantially a shape of an inverted frustum of a cone, said flexible thin portions each including an upper flexible portion and a lower flexible portion, said lower flexible portion being formed in a position which is more inward than said upper flexible portion.

9. A load converter as in claim 8, wherein said fixed portions are annular and located radially outside said thin flexible portions, said movable portions being located radially inside said thin flexible portions.

* * * * *